(12) United States Patent
Mulholland et al.

(10) Patent No.: US 10,754,556 B2
(45) Date of Patent: Aug. 25, 2020

(54) PRIORITIZATION OF VIRTUAL VOLUMES TO TAKE OFFLINE IN A THIN PROVISIONING SYSTEM

(71) Applicant: International Business Machines Corporation, Armonk, NY (US)

(72) Inventors: Miles Mulholland, Chandlers Ford (GB); Ben Sasson, North Baddesley (GB); Gordon Hutchison, Eastleigh (GB); Lee J. Sanders, Chichester (GB)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 15/634,335

(22) Filed: Jun. 27, 2017

(65) Prior Publication Data
US 2018/0373444 A1 Dec. 27, 2018

(51) Int. Cl.
*G06F 3/06* (2006.01)
*G06F 12/02* (2006.01)

(52) U.S. Cl.
CPC ............ *G06F 3/0619* (2013.01); *G06F 3/064* (2013.01); *G06F 3/0608* (2013.01); *G06F 3/0634* (2013.01); *G06F 3/0665* (2013.01); *G06F 3/0683* (2013.01); *G06F 3/0689* (2013.01); *G06F 12/0253* (2013.01); *G06F 2212/702* (2013.01); *G06F 2212/7205* (2013.01)

(58) Field of Classification Search
CPC .... G06F 3/0619; G06F 3/0665; G06F 3/0689; G06F 12/0253; G06F 2212/702; G06F 2212/7205
See application file for complete search history.

(56) References Cited

U.S. PATENT DOCUMENTS

| | | | |
|---|---|---|---|
| 8,244,850 B1 | 8/2012 | Roussos | |
| 8,250,329 B2 | 8/2012 | Nicholson et al. | |
| 8,612,703 B2 | 12/2013 | Maki | |
| 9,092,376 B1 | 7/2015 | Chelur et al. | |
| 9,229,849 B2 | 1/2016 | Yang | |
| 2007/0150691 A1* | 6/2007 | Illendula | G06F 12/0246 711/170 |

(Continued)

OTHER PUBLICATIONS

Mulholland et al., "Prioritization of Virtual Volumes To Take Offline in a Thin Provisioning System", U.S. Appl. No. 15/895,028, filed Feb. 13, 2018.

(Continued)

*Primary Examiner* — Mano Padmanabhan
*Assistant Examiner* — Andrew J Cheong
(74) *Attorney, Agent, or Firm* — Stephen R. Yoder; David B. Woycechowsky

(57) ABSTRACT

Prioritizing virtual volumes to take offline in a thin provisioning system with garbage collection. The method categorizes virtual volumes based on garbage collection properties of their write behavior and adds metadata indicating a category of a virtual volume. The method schedules virtual volumes to be taken offline by predicting virtual volume space utilization of active virtual volumes for a defined time period in combination with estimated garbage collection in that period to determine a need to take virtual volumes offline. The method selects virtual volumes to take offline by their category to ensure that the virtual volumes producing the most garbage collection unfriendly workloads are taken offline first.

12 Claims, 8 Drawing Sheets

(56) References Cited

U.S. PATENT DOCUMENTS

| | | |
|---|---|---|
| 2014/0196033 A1 | 7/2014 | Bobroff |
| 2014/0359201 A1 | 12/2014 | Chakrabarti |
| 2017/0046256 A1 | 2/2017 | Horspool et al. |
| 2017/0351606 A1 | 12/2017 | Chakrabarti |
| 2017/0351968 A1* | 12/2017 | Bowers .................. G06F 3/067 |
| 2018/0203612 A1* | 7/2018 | Kats ..................... G06F 3/0608 |

OTHER PUBLICATIONS

IBM, "Thin-provisioned volumes", downloaded on Jun. 20, 2017, <https://www.ibm.com/support/knowledgecenter/STKMQV_7.7.0/com.ibm.storage.vflashsystem9000.7.7.doc/svc_spaceefficentvdisks_3r7ayd.html?view=embed>, 3 pages.

* cited by examiner

PRIORITIZATION OF VIRTUAL VOLUMES TO TAKE OFFLINE IN A THIN PROVISIONING SYSTEM

BACKGROUND

The present invention relates to thin provisioning storage systems, and more specifically, to prioritization of virtual volumes to take offline in a thin provisioning system.

Thin provisioning is a technology that allows large volumes of storage to be presented through a "virtual" disk, whilst the underlying storage used by this volume is kept to a minimum. The way this is achieved is by not provisioning all storage on physical disk creation and only expanding the physical disk as and when storage is required. If a disk has only been partially used by the user, only part of the volume is allocated resulting in far lower storage allocation requirements for these volumes.

Thin provisioning makes use of a forward lookup map: a data structure that maps a virtual address to where on the physical domain the underlying storage for that virtual address write lives. Typically, this data structure maps virtual address "grains" (fixed size chunks of virtual space) to the physical domain. A reverse-lookup mapping is also typically maintained, either for garbage collection purposes, or to allow a physical-to-virtual domain lookup in the event that data corruption should occur. This reverse lookup is typically maintained on a reverse lookup tree (RLT) or table data structure.

Over allocation is the notion that one can have far more storage virtually allocated than is physically available to the user. This can mean that whilst 10 terabytes of storage is presented to a collection of servers, there may only be 1 terabyte worth of physical domain. So long as the storage requested from the servers (and the metadata) does not exceed 1 terabyte, this will hit no issues. However, should storage requirements exceed the available storage, typical behavior would be to take the thin provisioned volumes offline or place them into a read-only mode.

Space in the physical volumes that is no longer being referenced by a virtual address can be reused by a garbage collection mechanism. Typically, garbage collection operates by having allocation regions that can support multiple writes. When an allocation region has many empty spaces in it, it could be subjected to garbage collection. Garbage collection typically will: (i) copy the data inside of the allocation region, (ii) update the forward lookup mapping to mark the new location of copied data, and (iii) free the allocation region for reuse, or to be returned to the storage pool.

SUMMARY

According to an aspect of the present invention there is provided a computer-implemented method for prioritizing virtual volumes to take offline in a thin provisioning system with garbage collection. According to this aspect, method includes the following operations (not necessarily in the following order): (i) categorizing virtual volumes based on garbage collection properties of their write behavior; (ii) adding metadata indicating a category of a virtual volume; (iii) scheduling virtual volumes to be taken offline, with the scheduling including: (a) predicting virtual volume space utilization of active virtual volumes for a defined time period, (b) estimating garbage collection in that period, and (c) determining a need to take virtual volumes offline based, at least in part, upon the prediction of virtual volume space utilization and the estimation of garbage collection; and (iv) selecting virtual volumes to take offline by their category to ensure that the virtual volumes producing the most garbage collection unfriendly workloads are taken offline first.

According to another aspect of the present invention there is provided a system for prioritizing virtual volumes to take offline in a thin provisioning system with garbage collection. According to this aspect, the system includes: a categorizing component for categorizing virtual volumes based on garbage collection properties of their write behavior and a category metadata component for adding metadata indicating a category of a virtual volume; a scheduling component for scheduling virtual volumes to be taken offline, including a utilization prediction component for predicting virtual volume space utilization of active virtual volumes for a defined period and a garbage collection estimating component for estimating garbage collection in that period to determine a need to take virtual volumes offline; and a selecting component for selecting virtual volumes to take offline by their category to ensure that the virtual volumes producing the most garbage collection unfriendly workloads are taken offline first.

According to another aspect of the present invention there is provided a computer program product (CPP) for prioritizing virtual volumes to take offline in a thin provisioning system with garbage collection. According to this aspect, the CPP includes a computer readable storage medium having program instructions embodied therewith, the program instructions executable by a processor to cause the processor to: categorize virtual volumes based on garbage collection properties of their write behavior and add metadata indicating a category of a virtual volume; schedule virtual volumes to be taken offline by predicting virtual volume space utilization of active virtual volumes for a defined time period in combination with estimated garbage collection in that period to determine a need to take virtual volumes offline; and select virtual volumes to take offline by their category to ensure that the virtual volumes producing the most garbage collection unfriendly workloads are taken offline first.

According to another aspect of the present invention, there is a method, computer program product and/or system that performs the following operations (not necessarily in the following order): (i) receiving a virtual volume data set including information indicative of an identity of a plurality of virtual volumes and write behavior respectively corresponding to the virtual volumes of the plurality of virtual volumes; (ii) for each given virtual volume of the plurality of virtual volumes, determining, by machine logic based rules, a garbage collection category, of a plurality of predetermined garbage collection categories, corresponding to the given virtual volume, with the determination being based, at least in part, upon write behavior of the given virtual volume, with the predetermined garbage collection categories corresponding to relative levels of garbage collection friendliness; (iii) for each given virtual volume of the plurality of virtual volumes, adding garbage collection metadata to the given virtual volume, with the metadata including information indicative of the garbage collection category of the virtual volume; (iv) selecting, by machine logic based rules, selected virtual volume(s), with the selection being based, at least in part, upon garbage collection categories indicated by the garbage collection metadata of the plurality of virtual volumes; and (v) selectively taking the selected virtual volume(s) offline, while maintaining virtual volume(s) of the plurality of virtual volumes other than the selected virtual volume(s) online.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system provide a mechanism that, in the event of a predicted out of space event, allows prioritization of which virtual volumes are taken offline in order to attempt to minimize disruption to the user whilst garbage collection is carried out.

Figure 1:
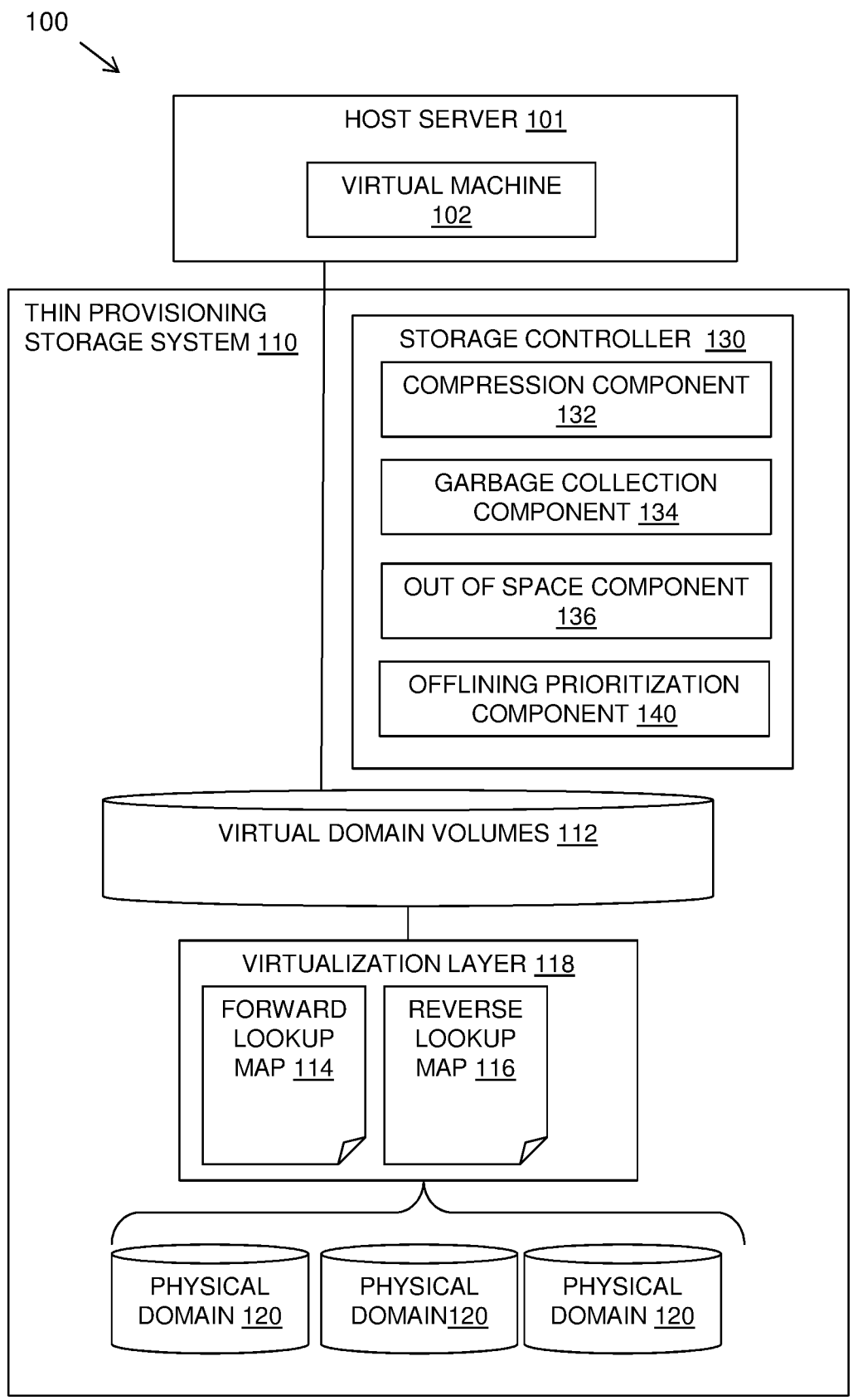
FIG. 1 is a block diagram of an example embodiment of a thin provisioning storage system of the present invention.

Referring to FIG. 1, a block diagram 100 illustrates an example embodiment of a thin provisioning storage system 110 used by a host server 101 that may run virtual machines 102. The terms volume and disk are often used interchangeably in storage systems to refer to a storage element. These terms have been clarified as virtual or physical where required for clarity.

Thin provisioning is a method for optimizing storage utilization by allocating to a volume only the space required to hold its actual data, deferring additional space allocation to the time that it is needed. Thin provisioning is implemented on the storage level, and it is transparent to the host server 101 using the volume.

The thin provisioning storage system 110 has virtual domain volumes 112 presenting large volumes of virtual capacity with a virtualization layer 118 for mapping to an underlying physical domain 120 whose volume is kept to a minimum. This is achieved by not provisioning all the storage on physical disk creation and only expanding the physical disk as and when storage is required. If a physical disk has only been partially used by the user, only part of the volume is allocated resulting in far lower storage allocation requirements for these volumes.

Thin provisioning provides virtual capacity to a logical volume (logical unit number or LUN) and passes that LUN to the host server 101. The host sees the full capacity of the LUN when, in fact, the LUN is only backed with partial capacity of the physical disks 120, or the capacity is dynamically allocated as data is written. In this way, thin provisioning provides significant improvements in data storage efficiency by overcoming the traditional problem of hosts only partially using the capacity of the LUNs assigned to them.

This approach enables capacity to be allocated based on the total space actually used rather than just the space allocated. The result is improved storage utilization rates, leading to greatly reduced capital and operational costs.

Thin provisioning makes use of a forward lookup map 114 in the form of a data structure that maps a virtual address to where on the physical domain 120 the underlying storage for that virtual address write lives. The forward lookup map 114 may map virtual address "grains" (fixed size chunks of virtual space) to the physical domain 120. A reverse lookup map 116 is also typically maintained, for garbage collection purposes and/or to allow a physical-to-virtual domain lookup in the event that data corruption occurs. This reverse lookup map 116 is typically maintained on a reverse lookup tree (RLT) or table data structure. The forward lookup map 114 and the reverse lookup map 116 are stored on separate storage.

The thin provisioning storage system 110 may include a storage controller 130 for handling storage functionality of the system.

The storage controller 130 may include a compression component 132. A compressed volume makes use of thin provisioning technology and compression to reduce the amount of storage used by the volume. A given virtual grain may be mapped to a far smaller area on the physical disk; however, the size of this area of physical disk is dependent on the data's compressibility. This means that there is no guarantee that if one rewrites a given virtual address that it will fit in the space previously used. The trivial solution for this problem is to always write to new physical addresses on any new write input/output (IO). This causes all new writes to be performed in a sequential stream of write, which can be advantageous for write IO performance.

The storage controller 130 may include garbage collection component 134 for reclaiming space in the physical domain 120 that is no longer being referenced by a virtual address. The reverse lookup map 116 is populated upon forward lookup map 114 population and is key to garbage collection, as the garbage collection component 134 uses the reverse lookup table 116 as a means to determine the state of the physical domain 120.

Typically, garbage collection operates by having allocation regions that can support multiple writes. When an allocation region has many empty spaces in it, it may be subjected to garbage collection. Garbage collection may copy the data from the allocation region, update the forward lookup map 114 to mark the new location of it, and free the allocation region for reuse, or to be returned to the storage pool.

The storage controller 130 may include an out of space component 136 for handling out of space scenarios. This may take a volume into a read only state such that further storage cannot be allocated but existing virtual addresses can be overwritten.

The described system provides an offlining prioritization component 140 for classifying virtual volumes and their write behavior to provide an order in which virtual volumes should be taken offline.

The prioritization is designed to minimize the impact of write workload spikes against the stability of the whole storage system, and ensure that garbage collection can be carried out efficiently such that sufficient storage is available to support the remaining volumes.

The prioritization of which virtual volumes are taken offline is based on garbage collection behavior and may be carried out without user intervention.

This flexible offlining behavior attempts to keep as much of the system online whilst maintaining priority volumes. By being aware of garbage collection behavior as part of the offlining mechanism, low-space scenarios may be avoided and storage administrators may be given more warning.

In one example embodiment, the ordering for virtual volumes being taken offline may be determined using one, or more, of the following machine logic based rules: (i) volumes producing many new writes may be taken offline; (ii) volumes producing garbage-collection unfriendly write workloads may be taken offline next; and/or (iii) volumes producing garbage-collection friendly write workloads may be taken offline last out of non-priority volumes.

Ideally, priority volumes are not taken offline; however, these may be taken offline last if there is insufficient space to continue operating.

Figure 2A:
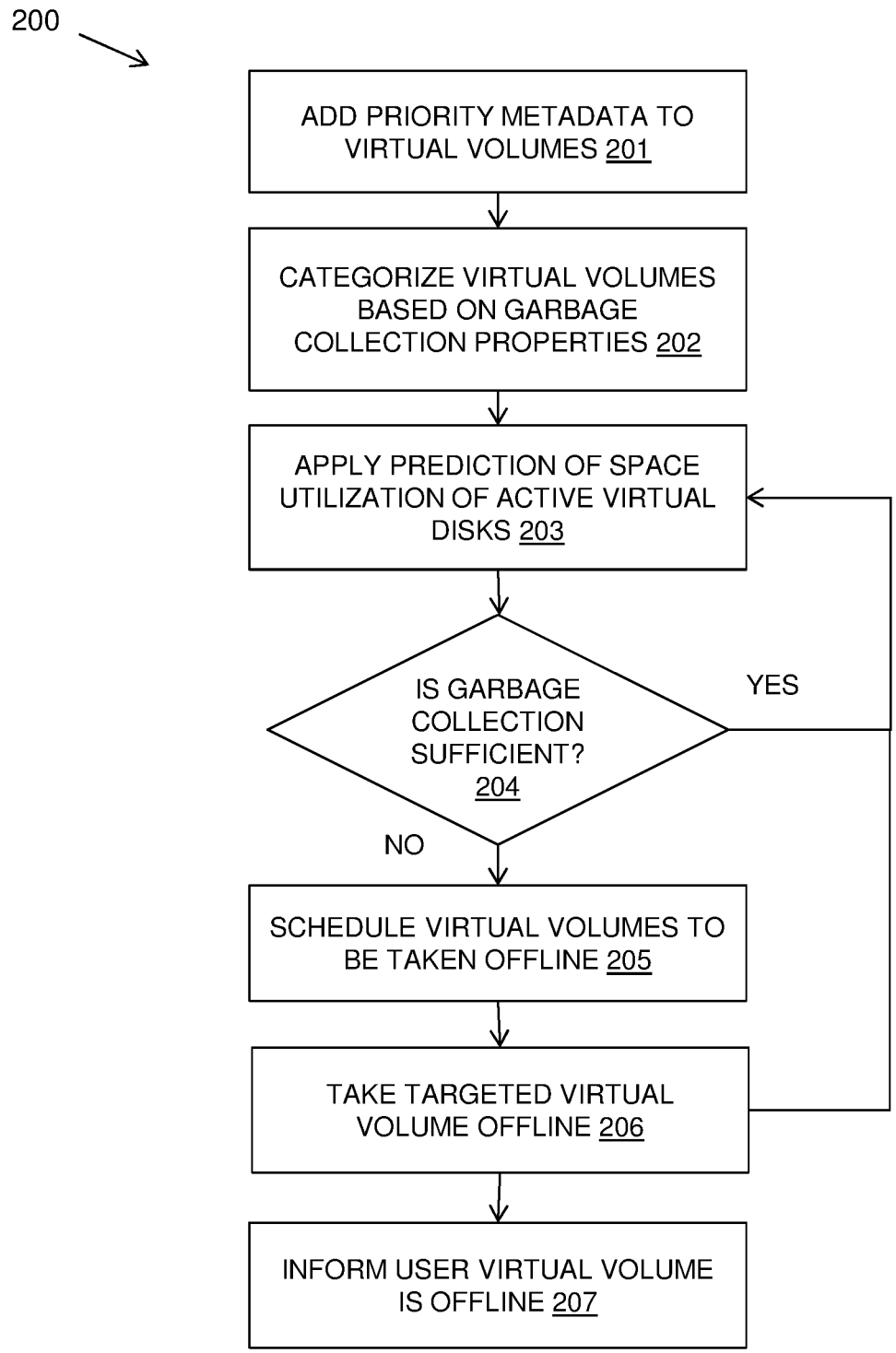
FIGS. 2A and 2B are flow diagrams of example embodiments of aspects of a method of the present invention.

Referring to FIG. 2A, a flow diagram 200 shows an example embodiment of an aspect of taking virtual volumes offline in accordance with the described method.

The method adds 201 priority metadata to virtual domain volumes. This may mark the virtual domain volumes as "priority" or "non-priority", and this may be extended to multiple priority levels, if desired.

The virtual domain volumes may be categorized 202 based on garbage collection properties. A categorization function may be defined to record the properties of IO to a virtual domain volume that indicate the garbage collection properties of the writes.

A prediction function may be applied 203 that predicts space utilization for the active virtual disks for a predefined time in advance. For example, this prediction may be based on the space these disks have used previously.

It may be determined 204 if a current garbage collection rate will be sufficient to support the predicted future IO in the predefined time period. If the garbage collection rate is sufficient, the method may loop to re-apply the prediction 203 for a next time period.

If it is determined that the garbage collection rate is insufficient, the method may schedule 205 virtual volumes to be taken offline from the least favorable category first. Members of a target category may be sorted, selecting high space utilization volumes to be taken offline first. An embodiment of the scheduling method is described in more detail with reference to FIG. 3.

A targeted volume may be taken 206 offline and the method may re-evaluate 203 the prediction of space utilization and determine 204 if the resulting change to the garbage collection will be sufficient to enable the remaining volumes to have sufficient storage to continue.

The user may be informed 207 that the targeted volume has been taken offline.

The prediction of space utilization may be used to determine when space becomes available again and the method may bring the volumes back online in a preferred order.

In order to bring a volume online again, there must be sufficient space to be able to ensure that the volume is not taken offline again soon after it is brought back online. One simple method to ensure this may be to depend on administrator intervention to bring a volume back online. Given that a volume going offline is likely to take down applications that may require recovery actions, this may be acceptable.

Alternatively, there may be an automated method for onlining volumes as described below.

Figure 2B:
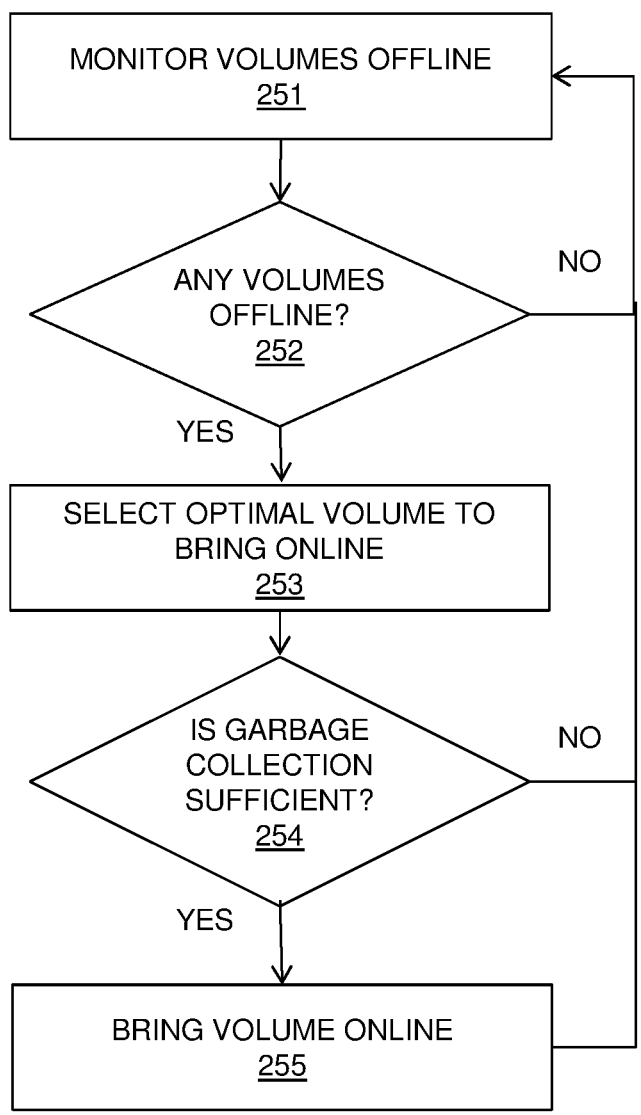

Referring to FIG. 2B, a flow diagram 250 shows an example embodiment of an aspect of automatically putting virtual volumes back online in accordance with the described method.

The volumes that have been taken offline are monitored 251 and it may be determined 252 if there are any volumes offline. If there are no volumes offline, the monitoring 251 may continue with repeated checking until it is determined that there are volumes offline.

When there are volumes offline, the method may select 253 an optimal volume to bring back online. The selection of a volume to bring back online may functionally be the reverse order to the order of selection for taking volumes offline or another predefined function. The method may allow a user or administrator to change the priority of a volume in order to cause it to be brought online sooner. For example, the volumes that are marked as priority may be selected to be brought back online first, followed by optimal garbage collection candidates as the next sort mechanism.

It may be determined 254 if the current garbage collection is sufficient to bring the selected volume back online. If the garbage collection is not sufficient, the method may loop to continue monitoring 251 volumes offline. If the garbage collection is considered sufficient, the selected volume may be brought back online 255. The method may wait for the garbage collection to be sufficient to bring more than one volume back online.

The determination 254 may consider the expected use of the remaining online volumes plus the expected use of the selected offline volume to be brought back online. It may be assumed that the selected offline volume continues to have the same space utilization characteristics as it did prior to going offline. Based on this, the method may determine whether or not the selected offline volume has a good chance of surviving once being brought back online (for example, due to the provisioning of additional storage, more efficient garbage collection opportunities, or pool utilization changes). There may be some measure of hysteresis mechanism or buffer to prevent bringing a volume back online only for it to immediately go offline again. The hysteresis may be defined as some constant or percentage of the backend storage to prevent volumes to prevent volumes toggling online and offline continuously.

Priority and categorization will be discussed in the following paragraphs.

By deliberately taking offline virtual volumes that have high utilization, the method and system attempts to ensure that the volumes producing the most garbage collection unfriendly workloads are taken offline first. This is notably volumes with highly random workloads and low amounts of rewrite IO. Sequential workloads are preferable to keep online compared to random workloads for multiple reasons, as follows.

Random workloads typically overwrite random areas of the physical domain. This will mean that if 10% of physical domain is rewritten by a random process, 10% of the disk will not be freed up without garbage collection operating, as this will free up 10% of the garbage collection regions across the physical domain rather than whole garbage collection regions for reuse.

To perform garbage collection in the above case, 90% of the garbage collection region must be translocated. To do this the data is moved to an active region, and then the forward lookup metadata updated. Under a random IO workload, this is unlikely to be cached and is likely to require far more updates compared to an equivalent set of virtually sequential IO under most sensible implementations of the forward lookup metadata. For example, the forward lookup metadata may be implemented as a B-Tree. A random workload may need to update all leaves in a B-Tree for 10% physical domain being changed, whilst a sequential workload would likely require only 10% of the leaves being changed.

As a result of this, random workloads require far more time to garbage collect versus sequential workloads. If the priority is maintaining the priority-disks, it is preferable to disable these random workload disks first compared to sequential workloads.

Each virtual domain disk may have a priority field stored in the virtual disk's metadata. User-facing disks are often referred to as volumes and are presented in a granularity of user-volumes that may have priority fields applied.

A categorization method and component are provided to categorize the IO pattern of each virtual domain disk or volume based on the past IO patterns. This is an example embodiment and more sophisticated categorization functions may be devised with categorization based on garbage collection behavior of the volumes in question.

In one embodiment, the following categories of non-priority volumes may be used: (i) "Random—Low rewrite"—that is, difficult to garbage collect, few garbage collection opportunities; (ii) "Sequential—Low rewrite"—that is, simple to garbage collect, few garbage collection opportunities; (iii) "Random—High rewrite"—that is, difficult to garbage collect, many garbage collection opportunities; (iv) "Sequential—High rewrite"—i.e. simple to garbage collect, many garbage collection opportunities. In some embodiments, machine logic based rules determine an order in which data is to be taken offline based upon which category the data falls into in the foregoing list.

For a given disk, this could be determined by operations of the following code:
randomness(disk)=sequential_write_count_24hrs/ total_write_count_24hrs>80% ? 'sequential': 'random'; (ii) rewriteness(disk)=rewrite_write_count_24hrs/ total_write_count_24hrs>50% ? 'high_rewrite': 'low rewrite';
A "sequential write" is determined as a single write from the disk being virtually consecutive with the previous write, and a "rewrite" is one where it is overwriting a virtual logical block address (LBA) which has already been written to.

Categorization mechanisms are a desirable heuristic. Determining the cost of garbage collecting a disk is difficult and expensive, as it requires processing of the reverse lookup metadata. Garbage collection needs to perform an IO to move the data itself, an IO to update the forward lookup metadata, and an eventual IO to update the reverse lookup metadata. The amount of work can vary based on the caching characteristics of the associated metadata structures.

For example, a random workload of one block of IO (causing random invalidations across both the physical and virtual domains) will require disparate updates to both the forward lookup map (as with tree structures common to this field, it is unlikely to be cached), random updates to the reverse lookup map (again, unlikely to be cached) and will require many blocks to be moved to recover the single block of invalidated IO.

A sequential workload will hopefully invalidate a previously sequentially written piece of data (assuming workloads are relatively stable). A block may be freed trivially, with no additional work from garbage collection required. If not, it is likely that the writes which need to be moved by garbage collection will belong to sequential virtual LBAs and that the invalidated areas belong to the same general area on disk. As a result, to reclaim storage in this area, it is only needed to update a small portion of the forward lookup map, reverse lookup tree and data domain.

A simple example of this behavior is given below to show the costs involved.

Random workload garbage collection behavior:
Key: $(number)=data–forward lookup leaf required to be updated, F=free space, I=Invalidated data, [<one block>|<one block>] (assume block moves cost 1 RLT write)
Pre GC domain: [14I9|24lI|9461|95I1|7I65|FFFF|FFFF FFFF|FFFF|FFFF]–
GC-step1: [FFFF|24lI|9461|95I1|7I65|149F|FFFF FFFF|FFFF|FFFF]–Cost: 3 moves, 3 forward lookup updates, 2 RLT updates (source–dest)
GC-step2: [FFFF|FFFF|9461|95I1|7I65|1492|41FF FFFF|FFFF|FFFF]–Cost: 3 moves, 3 forward lookup updates, 2 RLT updates (source–dest–assume caching on dest)
GC-step3: [FFFF|FFFF|9461|FFFF|7I65|1492|4195 1FFF|FFFF|FFFF]–Cost: 3 moves, 3 forward lookup updates, 2 RLT updates (source–dest–assume caching on dest)
GC-step4: [FFFF|FFFF|9461|FFFF|FFFF|1492|4195 1765|FFFF|FFFF]–Cost: 3 moves, 3 forward lookup updates, 2 RLT updates (source–dest–assume caching on dest)
Total cost: 12 moves, 12 forward lookup updates, 8 RLT updates.

Sequential workload garbage collection behavior:
Key: $(number)=data–forward lookup leaf required to be updated, F=free space, I=Invalidated data, [<one block>|<one block>] (assume block moves cost 1 RLT write)
Pre GC domain: [11II|II22|3333|4444|5555|FFFF|FFFF FFFF|FFFF|FFFF]
GC-step1: [FFFF|II22|3333|4444|5555|11FF|FFFF FFFF|FFFF|FFFF]–Cost: 2 moves, 1 forward lookup update, 2 RLT updates (source+dest)
GC-step2: [FFFF|FFFF|3333|4444|5555|1122|FFFF FFFF|FFFF|FFFF]–Cost: 2 moves, 1 forward lookup update, 2 RLT updates (source+dest–assuming caching on dest)
Total cost: 4 moves, 2 forward lookup updates, 4 RLT updates.

Here, for the same amount of invalidation IO, over double the amount of work is required to reclaim a block dependent on the randomness of the workload. This is over a trivial problem domain: over larger domains, with more leaves and a lower cache hit chance (and more data to move), the problem only increases in scale.

An embodiment of a garbage collection and allocation scheduler will now be discussed.

A garbage collection scheduler operates by using prior physical domain usage to predict space utilization. Space utilization per volume per day may also be tracked. The scheduler may attempt to allocate sufficient space for the expected workload, calculating on a per volume basis. In addition to this, by analyzing the reverse lookup metadata, a garbage collection schedule may be determined to maximize the amount of free space available.

Garbage collection operates over fixed-size chunks of the physical domain with the RLT metadata being split into chunks covering these regions. A heap data structure is maintained to order the garbage collection regions based on free space availability at the point of the schedule being created.

The time to perform garbage collection varies based on the amount of data that must be moved, and the amount of metadata updates that must be performed. Using this, the amount of garbage collection regions that can be garbage collected in 24 hours may be calculated, and thus the amount of space that can be recovered from garbage collection.

Based on prior history, it may be predicted that any given virtual volume will make use of the same amount of storage as the previous day. Other, more sophisticated allocation prediction mechanisms may be used. Based on the amount of free space in the physical domain, and the predicted space freed by garbage collection, it may be determined whether or not the IO can be supported.

The following logic is applied following garbage collection scheduling:

```
closed_vdisks = [ ];
expected_gc_recovery = calc_expected_gc( );
active_vdisks = set(all_virtual_disks);
expected_space_use = sum(map(calc_expected_use, active_vdisks));
while(expected_space_use > expected_gc_recovery + free_space)
{
    victim = select_victim(active_vdisks);
    if (no_victim)
    {
        raise out_of_space_warning;
    }
    active_vdisks.remove(victim);
    closed_vdisks.add(victim);
    expected_space_use = sum(map(calc_expected_use,
    active_vdisks));
}
set_offline(closed_vdisks);
if (!empty(closed_vdisks)) raise_warning_low_space;
select_victim makes use of the following logic:
select_victim(all_virtual_disks)
{
    list = all_virtual_disks.filter(is_random_low_rewrite( ) &&
!is_priority( ));
    list = list.sort(expected_space_use);
    if (!list.empty( )) return head(list)
    list = all_virtual_disks.filter(is_sequential_low_rewrite( ) &&
!is_priority( ));
    list = list.sort(expected_space_use);
    if (!list.empty( )) return head(list)
    list = all_virtual_disks.filter(is_random_high_rewrite( ) &&
!is_priority( ));
    list = list.sort(expected_space_use);
    if (!list.empty( )) return head(list)
    list = all_virtual_disks.filter(is_sequential_high_rewrite( ) &&
!is_priority( ));
    list = list.sort(expected_space_use);
    if (!list.empty( )) return head(list)
    return no_victim;
}
```

Figure 3:
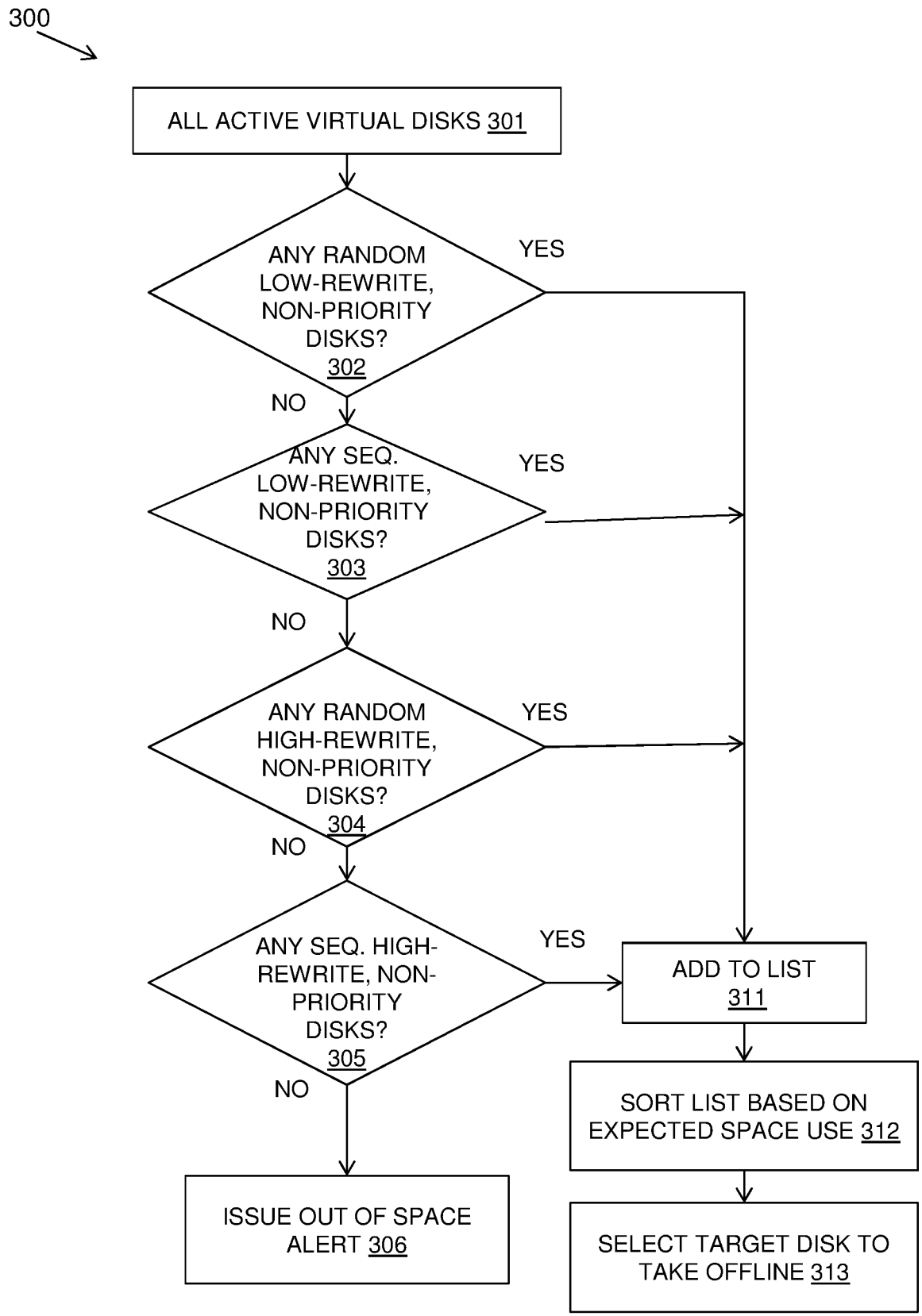
FIG. 3 is a flow diagram of an example embodiment of another aspect of a method of the present invention.

The above embodiment of target disk selection for taking a disk offline is illustrated in the flow diagram 300 of FIG. 3. The flow diagram 300 starts with all active virtual disks 301.

It may be determined 302 if there are any random, low-rewrite, non-priority disks. If so, the disks are added 311 to a list, the list may then be sorted 312 based on expected space use of the disks, and a target disk selected 313 from the list with the disk with the highest expected space use targeted for taking offline.

If it is determined 302 that there are no random, low-rewrite, non-priority disks, it may then be determined 303 if there are any sequential, low-rewrite, non-priority disks. If so, the disks are added 311 to the list and a target disk selected as above.

If it is determined 303 that there are no sequential, low-rewrite, non-priority disks, it may then be determined 304 if there are any random, high-rewrite, non-priority disks. If so, the disks are added 311 to the list and a target disk selected as above.

If it is determined 304 that there are no random, high-rewrite, non-priority disks, it may then be determined 305 if there are any sequential, high-rewrite, non-priority disks. If so, the disks are added 311 to the list and a target disk selected as above.

If it is determined 305 that there are no sequential, high-rewrite, non-priority disks, optionally priority disks may be taken offline. A pool level warning may be issued 306 as all suitable disks have been taken offline.

Using the above terminology, an automated method of bringing a disk back online may be defined as follows:

```
closed_vdisks = get_closed_vdisks;
while (true)
{
    candidate = select_priority_vdisk(closed_vdisks);
    if ( candidate == null )
    {
        sleep;
        continue;
    }
    expected_space_use = sum(map(calc_expected_use,
    active_vdisks)) + calc_expected_use(candidate);
    if ( expected_space_use + hysteresis < expected_gc_reco +
    free_space )
    {
        closed_vdisks.remove(candidate);
        active_vdisks.add(candidate);
    }
}
```

The hysteresis may be defined as a constant amount of a percentage of the backend storage to provide an added contingency capacity.

Figure 4:
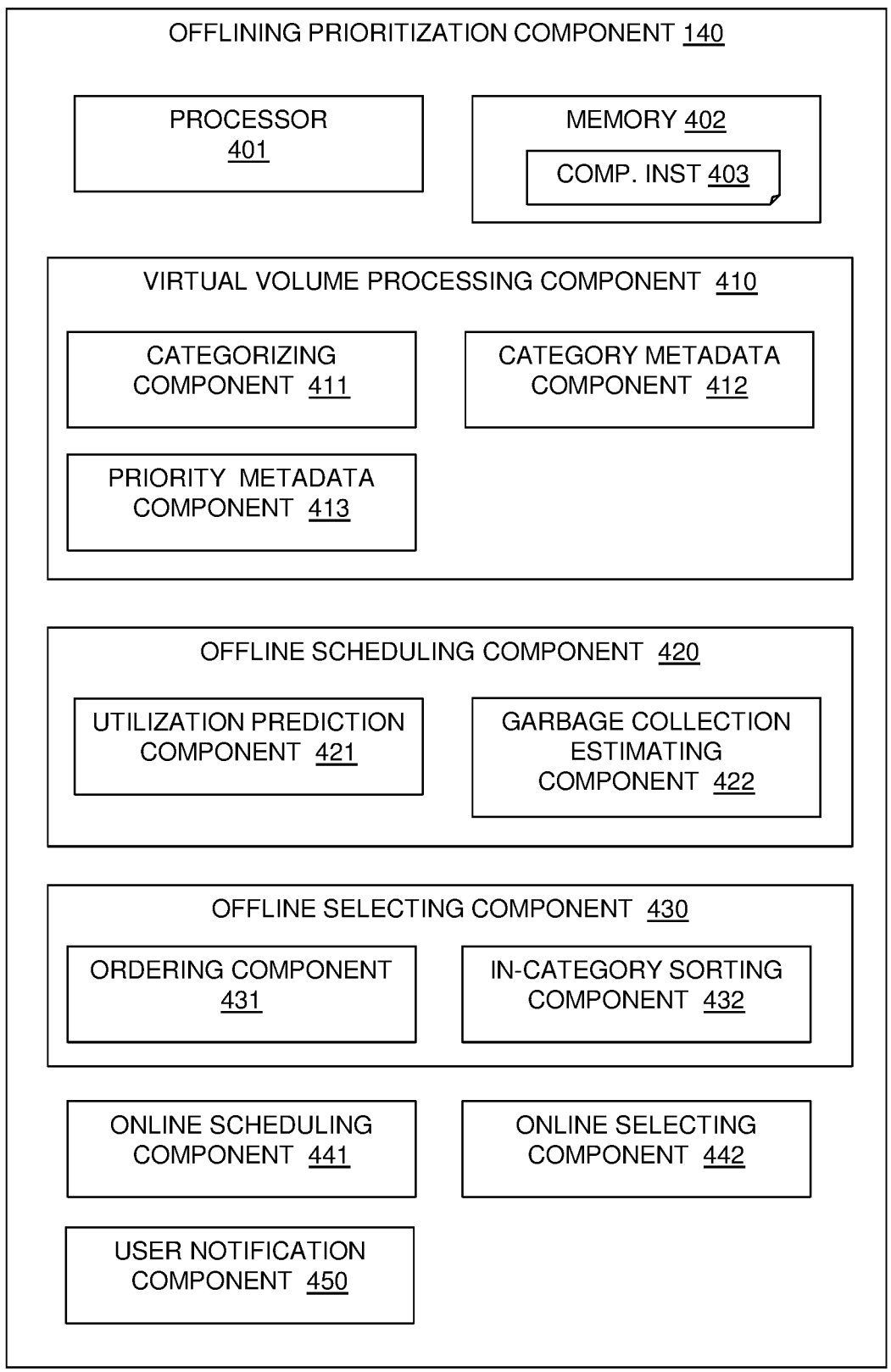
FIG. 4 is block diagram of an example embodiment of a system of present invention.

Referring to FIG. 4, a block diagram shows an example embodiment of the components of an offlining prioritization component 140.

The offlining prioritization component 140 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The offlining prioritization component 140 may include a virtual volume processing component 410 including a categorizing component 411 for categorizing virtual volumes based on garbage collection properties of their write behavior. The categorizing component 411 may use multiple categories based on a combination of a level of random or sequential write workloads and a level of new writes or rewrites, with a high level of random write workload with a low level of rewrite being a garbage unfriendly workload.

The virtual volume processing component 410 may also include a category metadata component 412 for adding metadata indicating a category of a virtual volume and a priority metadata component 413 for adding one or more levels of priority metadata to virtual volumes to exclude or defer priority virtual volumes from being selected to take offline.

The offlining prioritization component 140 may include an offline scheduling component 420 for scheduling virtual volumes to be taken offline, including a utilization prediction component 421 for predicting physical volume space utilization for a defined period and a garbage collection estimating component 422 for estimating garbage collection in that period to determine a need to take virtual volumes offline.

The offlining prioritization component 140 may include an offline selecting component 430 for selecting virtual volumes to take offline by their category to ensure that the virtual volumes producing the most garbage collection unfriendly workloads are taken offline first. The offline selecting component 430 may include an ordering component 431 for ordering categories, with the categories being ordered by garbage collection unfriendly workloads first. The offline selecting component 430 may also include an in-category sorting component 432 for sorting virtual volumes within a selected category to select high space utilization volumes to be taken offline first.

The offlining prioritization component 140 may also include an online scheduling component 441 for scheduling virtual volumes to be put back online by predicting physical volume space utilization for a defined period in combination with estimated garbage collection in that period to determine a need to take virtual volumes offline and an online selecting component 442 for selecting virtual volumes to put back online in the reverse order from which they were taken offline.

The offlining prioritization component 140 may also include a user notification component 450 for notifying a user of a virtual volume being taken offline or put back online.

Figure 5:
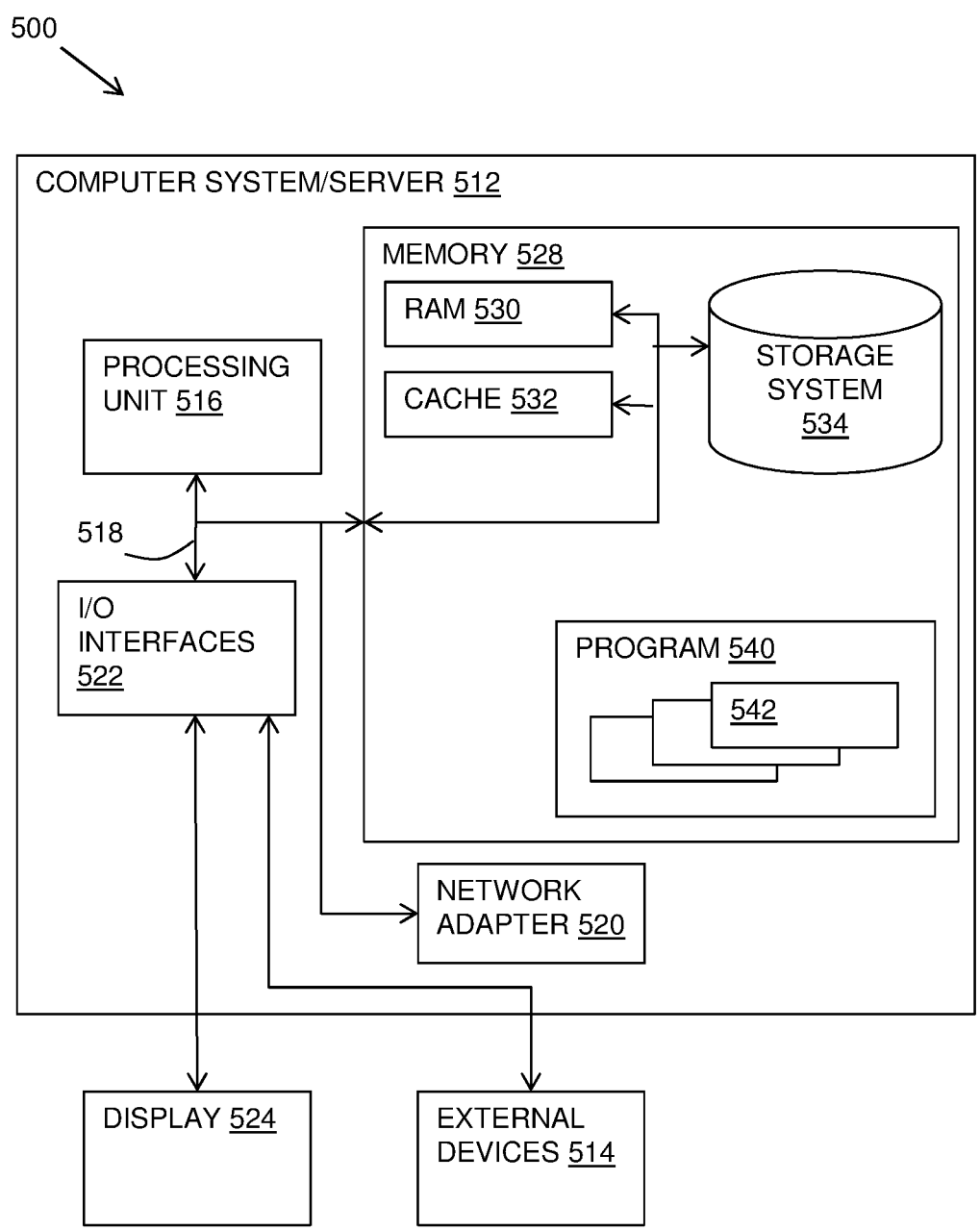
FIG. 5 is a block diagram of an embodiment of a computer system or cloud server in which the present invention may be implemented.

Referring now to FIG. 5, a schematic of an example of a system 500 in the form of a computer system or server is shown.

A computer system or server 512 may be operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

In FIG. 5, a computer system/server 512 is shown in the form of a general-purpose computing device. The components of the computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Some embodiments of the present invention may include one, or more, of the following features, characteristics, advantages and/or operations: (i) scheduling virtual volumes to be put back online by predicting virtual volume space utilization for a defined period in combination with estimated garbage collection in that period to determine if virtual volumes can be put back online; (ii) predicting virtual volume space includes predicting that an offline virtual volume will continue to have the same space utilization as it did prior to going offline to determine if there is sufficient capacity to put the virtual volume back online; (iii) selecting virtual volumes to put back online in the reverse order from which they were taken offline; and/or (iv) predicting virtual volume space utilization for a defined time period and estimated garbage collection in that period are based on utilization and garbage collection in a prior time period.

Some embodiments of the present invention may also include one, or more, of the following features, characteristics, advantages and/or operations: (i) a priority metadata component for adding one or more levels of priority metadata to virtual volumes to exclude or defer priority virtual volumes from being selected to take offline; (ii) the categorizing component uses multiple categories based on a combination of a level of random or sequential write workloads and a level of new writes or rewrites, with a high level of random write workload with a low level of rewrite being a garbage unfriendly workload; (iii) the selecting component for selecting virtual volumes to take offline includes an ordering component for ordering categories, with the categories being ordered by garbage collection unfriendly workloads first; (iv) a sorting component for sorting virtual volumes within a selected category to select high space utilization volumes to be taken offline first; (v) an online scheduling component for scheduling virtual volumes to be put back online by predicting virtual volume space utilization for a defined period in combination with estimated garbage collection in that period to determine a need to take virtual volumes offline; (vi) an online selecting component for selecting virtual volumes to put back online in the reverse order from which they were taken offline; and (vii) the program instructions are executable by a processor to cause the processor to schedule virtual volumes to be put back online by predicting virtual volume space utilization for a defined period in combination with estimated garbage collection in that period to determine if virtual volumes can be put back online.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some embodiments of the present invention may be implemented, in whole or in part, by cloud computing, which subject will be discussed in the following paragraphs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
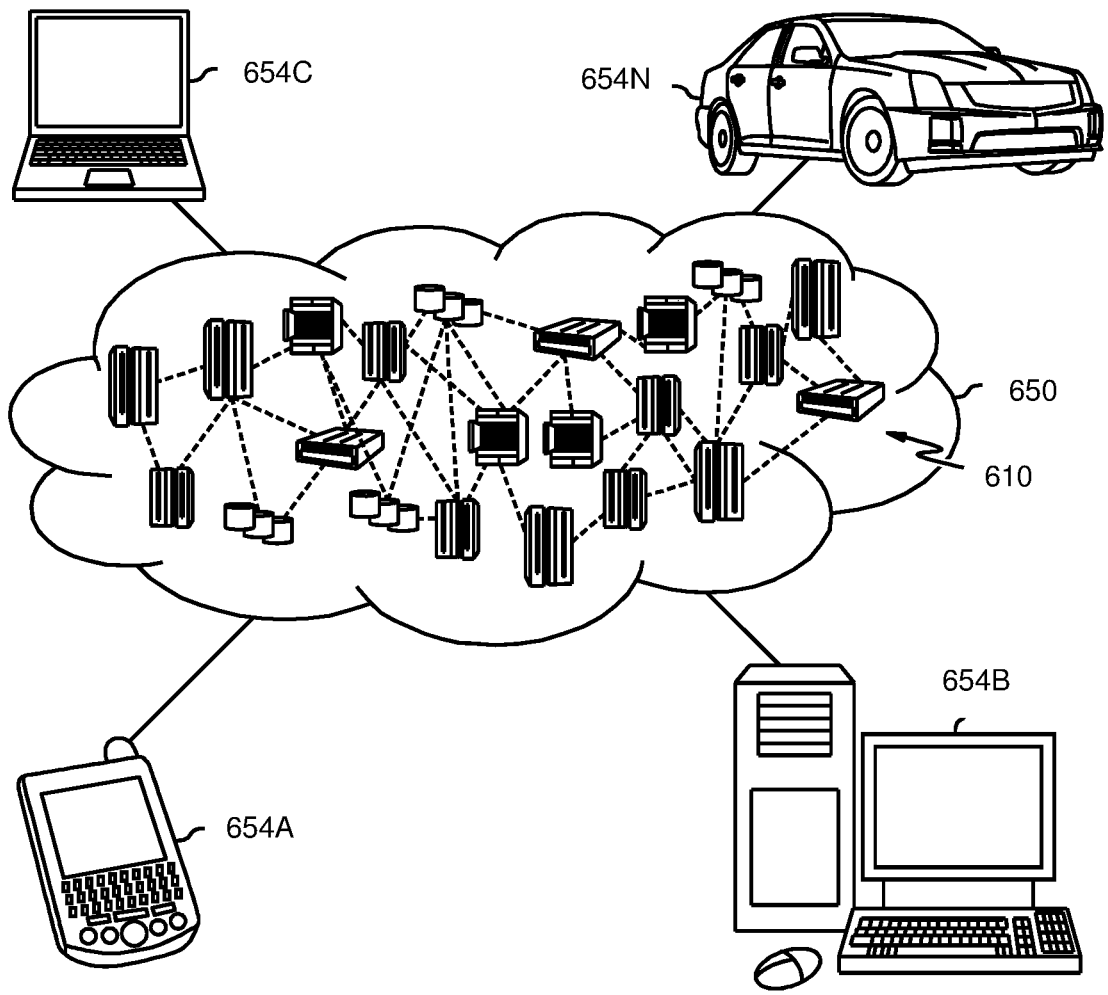
FIG. 6 is a schematic diagram of a cloud computing environment in which the present invention may be implemented.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
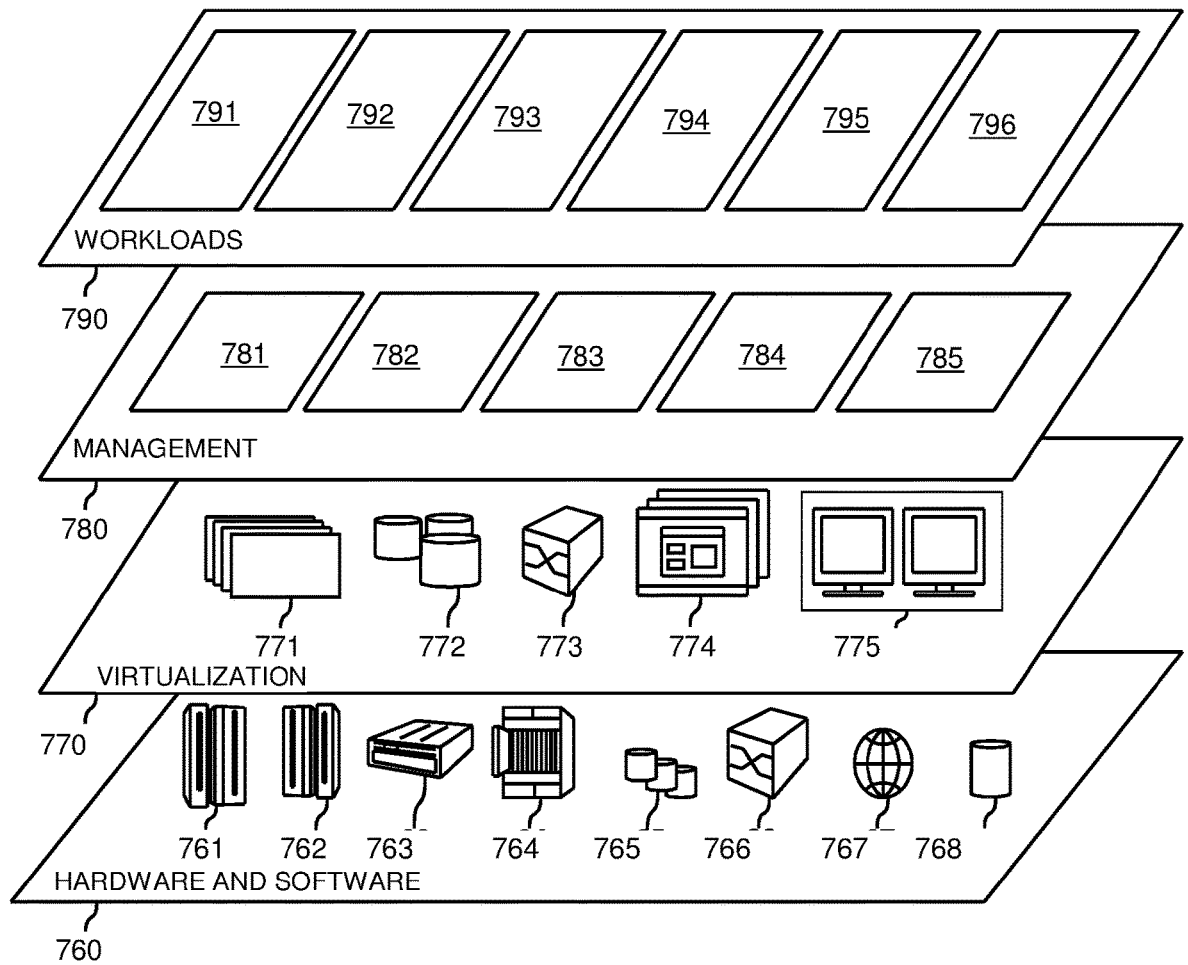
FIG. 7 is a diagram of abstraction model layers of a cloud computing environment in which the present invention may be implemented.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and storage management and prioritization of volume offlining in thin provisioning storage 796.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method comprising:
receiving a virtual volume data set including information indicative of an identity of a plurality of virtual volumes and write behavior respectively corresponding to the virtual volumes of the plurality of virtual volumes;
for each given virtual volume of the plurality of virtual volumes, determining, by machine logic based rules, a garbage collection category, of a plurality of predetermined garbage
collection categories, corresponding to the given virtual volume, with the determination being based, at least in part, upon write behavior of the given virtual volume, with the predetermined
garbage collection categories corresponding to a degree to which the given virtual volume is subject to garbage collection;
for each given virtual volume of the plurality of virtual volumes, adding garbage collection metadata to the given virtual volume, with the metadata including information indicative of the garbage collection category of the virtual volume;
selecting, by machine logic based rules, virtual volume(s), with the selection being based, at least in part, upon garbage collection categories indicated by the garbage collection metadata
of the plurality of virtual volumes to obtain selected virtual volume(s); and taking the selected virtual volume(s) offline, while maintaining virtual volume(s) of the plurality of virtual volumes other than the selected virtual volume(s) online, wherein:

the predetermined garbage collection categories are based on a relative proportion of random or sequential writes to new writes or rewrites.

2. The method of claim 1 further comprising:

estimating, by machine logic rules, a data volume of garbage collection for a predetermined time period to determine estimated garbage collection values during the predetermined time period;

predicting, by machine logic rules, virtual volume space utilization of active virtual volume(s) of the plurality of virtual volumes over the predetermined time period; and scheduling, by machine logic rules, the taking offline of the selected virtual volume(s) over the predetermined time period based, at least in part, upon the estimated garbage collection values and the predicted virtual volume space utilization.

3. The method as claimed in claim 1, further comprising:

adding one or more levels of priority metadata to virtual volumes to exclude or defer priority virtual volumes from being selected as selected virtual volume(s) to take offline.

4. The method as claimed in claim 1, further comprising sorting virtual volumes within a selected garbage collection category of the plurality of garbage collection categories to select the selected volume with a largest space utilization to be taken offline first.

5. A computer program product comprising:

a computer readable storage medium; and computer code stored on the computer readable storage medium, with the computer code including instructions for causing a processor(s) set to perform operations including the following:

receiving a virtual volume data set including information indicative of an identity of a plurality of virtual volumes and write behavior respectively corresponding to the virtual volumes of the plurality of virtual volumes, for each given virtual volume of the plurality of virtual volumes, determining, by machine logic based rules, a garbage collection category, of a plurality of predetermined garbage collection categories, corresponding to the given virtual volume, with the determination being based, at least in part, upon write behavior of the given virtual volume, with the predetermined garbage collection categories corresponding to a degree to which the given virtual volume is subject to garbage collection, for each given virtual volume of the plurality of virtual volumes, adding garbage collection metadata to the given virtual volume, with metadata including information indicative of the garbage collection category of the virtual volume, selecting, by machine logic based rules, virtual volume(s), with the selection being based, at least in part, upon garbage collection categories indicated by the garbage collection metadata of the plurality of virtual volumes to obtain selected virtual volume(s), and taking the selected virtual volume(s) offline, while maintaining virtual volume(s) of the plurality of virtual volumes other than the selected virtual volume(s) online, wherein: the predetermined garbage collection categories are based on a relative proportion of random or sequential writes to new writes or rewrites.

6. The computer program product of claim 5, wherein the computer code further includes instructions for causing the processor(s) set to perform the following operations:

estimating, by machine logic rules, a data volume of garbage collection for a predetermined time period to determine estimated garbage collection values during the predetermined time period;

predicting, by machine logic rules, virtual volume space utilization of active virtual volume(s) of the plurality of virtual volumes over the predetermined time period; and scheduling, by machine logic rules, the taking offline of the selected virtual volume(s) over the predetermined time period based, at least in part, upon the estimated garbage collection values and the predicted virtual volume space utilization.

7. The computer program product as claimed in claim 5, wherein the computer code further includes instructions for causing the processor(s) set to perform the following operations:

adding one or more levels of priority metadata to virtual volumes to exclude or defer priority virtual volumes from being selected as selected virtual volume(s) to take offline.

8. The computer program product as claimed in claim 5, wherein the computer code further includes instructions for causing the processor(s) set to perform sorting virtual volumes within a selected garbage collection category of the plurality of garbage collection categories to select the selected volume with a largest space utilization to be taken offline first.

9. A computer system comprising:

a processor(s) set;

a computer readable storage medium; and computer code stored on the computer readable storage medium, with the computer code including instructions for causing the processor(s) set to perform operations including the following:

receiving a virtual volume data set including information indicative of an identity of a plurality of virtual volumes and write behavior respectively corresponding to the virtual volumes of the plurality of virtual volumes, for each given virtual volume of the plurality of virtual volumes, determining, by machine logic based rules, a garbage collection category, of a plurality of predetermined garbage collection categories, corresponding to the given virtual volume, with the determination being based, at least in part, upon write behavior of the given virtual volume, with the predetermined garbage collection categories corresponding to a degree to which the given virtual volume is subject to garbage collection, for each given virtual volume of the plurality of virtual volumes, adding garbage collection metadata to the given virtual volume, with the metadata including information indicative of the garbage collection category of the virtual volume, selecting, by machine logic based rules, virtual volume(s), with the selection being based, at least in part, upon garbage collection categories indicated by the garbage collection metadata of the plurality of virtual volumes to obtain selected virtual volume(s), and taking the selected virtual volume(s) offline, while maintaining virtual volume(s) of the plurality of virtual volumes other than the selected virtual volume(s) online, wherein: the predetermined garbage collection categories are based on a relative proportion of random or sequential writes to new writes or rewrites.

10. The computer system of claim 9, wherein the computer code further includes instructions for causing the processor(s) set to perform the following operations:

estimating, by machine logic rules, a data volume of garbage collection for a predetermined time period to determine estimated garbage collection values during the predetermined time period;

predicting, by machine logic rules, virtual volume space utilization of active virtual volume(s) of the plurality of virtual volumes over the predetermined time period; and scheduling, by machine logic rules, the taking offline of the selected virtual volume(s) over the predetermined time period based, at least in part, upon the estimated garbage collection values and the predicted virtual volume space utilization.

11. The computer system as claimed in claim 9, wherein the computer code further includes instructions for causing the processor(s) set to perform the following operations:

adding one or more levels of priority metadata to virtual volumes to exclude or defer priority virtual volumes from being selected as selected virtual volume(s) to take offline.

12. The computer system as claimed in claim 9, wherein the computer code further includes instructions for causing the processor(s) set to perform sorting virtual volumes within a selected garbage collection category of the plurality of garbage collection categories to select high space utilization volumes to be taken offline first.

* * * * *